Patented Dec. 5, 1939

2,182,291

UNITED STATES PATENT OFFICE 2,182,291

BINDING MEDIUM

André Michel Fleuret, Paris, France, assignor to Etablissements Rouzaud & Fils, Paris, France, a corporation of France No Drawing. Application March 10, 1938, Serial No. 195,156. In France March 16, 1937

8 Claims. (Cl. 106—29)

My invention has for its object improvements in binding mediums of the magnesian type and in their preparation. Such improved binding mediums are intended for the most general applications and may be used with suitable admixtures of fillers as an artificial stone, a grindstone, a moulded product, a paint, a coating or the like.

Magnesian binding mediums are, as is well known, compositions comprising magnesium salts, preferably chloride, and magnesia with the possible addition of a soluble or insoluble sulphate and of fillers. These compositions are assumed to contain oxychlorides and/or oxysulphates. They form particularly valuable cements, so-called Sorel cements, which harden after a certain time.

Now I have found that the setting of such binding mediums and their ultimate mechanical properties and especially their stability towards water or weather are greatly improved by the incorporation of a more or less water-soluble compound of a metal of the fourth group of Mendelejeff's periodic system, preferably titanium, zirconium and thorium or else a thorium compound, water-soluble or not. Preferably the incorporation of such compounds of metals of the fourth group is such that the incorporated metal appears at least in part under the form of a molecularly dispersed compound. Even a catalytic proportion (0.0001% to 2%) of salts of one or more of the metals considered has a useful action, but preferably a greater proportion is used so that the compound of a metal of the fourth group may form a noticeable component of the final product. For instance I may proceed with 5 to 20 parts of the oxide contained in the compound for each 100 parts of the magnesia used in the preparation of the mixture.

I advantageously incorporate to an ordinary magnesian binding medium, in the making thereof, a compound having a certain solubility in water or in aqueous solutions of magnesium chloride, such as thorium chloride preferably in solution or thorium sulphate.

Favorable results are obtained with about 10 parts of $ThO_2$ (contained in sulphate for instance) for 100 parts of the magnesia used in the preparation of the binding medium.

The magnesium chloride used with the magnesia and the thorium or like salt is preferably in the form of a concentrated solution e. g. from about 20° Bé. to saturation.

I may incorporate fillers such as bauxite, silica passing through a 200 mesh sieve, barium sulphate, titanium oxide, saw dust and the like. The incorporation of the compounds of the metals defined hereinabove improves as stated the mechanical properties of the cement and more specifically its resistance to the action of water and weather. Thus an artificial stone prepared according to my invention may serve as a flagging in a rain exposed location without any drawback whereas a similar stone without the addition of compounds according to my invention, is disintegrated after a few weeks under the same circumstances.

*Example*

I admix

| | Grs. |
|---|---|
| MgO | 400 |
| Commercial sulphate of thorium (containing 46% $ThO_2$) | 80 |
| Very siliceous bauxite (containing 55% $Al_2O_3$) | 60 | and I add

| | |
|---|---|
| A solution of $MgCl_2$ having a specific weight of 1.290 | 280 |

I thoroughly mix these ingredients and grind the mixture, after which I pour it into a mould where it sets. The mixture may be used as a cement. This cement forms a solid paste in which part of the thorium compound seems to be molecularly dispersed. Color may be provided by the addition of metallic oxides or other pigments.

To the mixture disclosed just above I may add fillers in the case an artificial stone is required. Or again I may incorporate abrading substances such as carborundum, corundum or the like and mould the mixture with or without a filler to form a grindstone or a polishing stone.

A cheap, incombustible water-resistant paint may be obtained by incorporating to 780 to 980 parts of a solution of magnesium chloride having a specific weight between 1.18 and 1.29 about 1000 parts of a pulverized mixture, passing through a 300 mesh sieve, of 800 parts of magnesia, 100 parts of titanium oxide (acting as a white pigment) and 100 parts of thorium sulphate. Color may be incorporated to the white paint under the form of a suitable pigment.

In the preparation of the paint, the powder is poured just before use into the liquid in the proportions stated and the paste is then comminuted in a crushing and mixing machine.

What I claim is:

1. As a new and useful product a mixture comprising a magnesia cement and a thorium compound.

2. A mixture constituted by a Sorel cement and a thorium compound the $ThO_2$ contents of which is in a proportion sufficient to form a noticeable component of the final product.

3. A mixture constituted by a Sorel cement containing a thorium compound molecularly distributed at least in part in the paste, in a proportion sufficient to form a noticeable compound of the final product.

4. A mixture comprising a Sorel cement, a thorium compound and bound sulphuric acid.

5. A mixture comprising a Sorel cement, fillers and a thorium compound.

6. A mixture comprising magnesium oxychloride, a compound of thorium and fillers.

7. A composition of matter comprising magnesium oxychloride, a compound of thorium, fillers and an abrading material.

8. A composition of matter comprising a magnesia binding medium paste interspersed with a thorium compound.

ANDRÉ MICHEL FLEURET.